United States Patent
Bitterolf et al.

(10) Patent No.: US 11,262,721 B2
(45) Date of Patent: Mar. 1, 2022

(54) AUTOMATIC OPTIMIZATION OF THE PARAMETERIZATION OF A MOVEMENT CONTROLLER

(71) Applicant: SIEMENS AKTIENGESELLSCHAFT, Munich (DE)

(72) Inventors: David Bitterolf, Erlangen (DE); Carsten Hamm, Eggolsheim (DE); Theo Reichel, Forchheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 168 days.

(21) Appl. No.: 16/342,830

(22) PCT Filed: Oct. 17, 2017

(86) PCT No.: PCT/EP2017/076400
§ 371 (c)(1),
(2) Date: Apr. 17, 2019

(87) PCT Pub. No.: WO2018/073200
PCT Pub. Date: Apr. 26, 2018

(65) Prior Publication Data
US 2020/0174436 A1  Jun. 4, 2020

(30) Foreign Application Priority Data
Oct. 18, 2016 (EP) ..................... 16194333

(51) Int. Cl.
*G05B 19/042* (2006.01)
*G05B 19/418* (2006.01)

(52) U.S. Cl.
CPC ... *G05B 19/0425* (2013.01); *G05B 19/41875* (2013.01); *G05B 2219/23399* (2013.01); *G05B 2219/31304* (2013.01)

(58) Field of Classification Search
CPC .......... G05B 19/0425; G05B 19/41875; G05B 2219/23399; G05B 2219/31304;
(Continued)

(56) References Cited

U.S. PATENT DOCUMENTS

| 5,430,643 A | 7/1995 | Seraji |
| 2003/0057901 A1 | 3/2003 | Tomita |

(Continued)

FOREIGN PATENT DOCUMENTS

| CN | 1426545 A | 6/2003 |
| CN | 1870531 A | 11/2006 |

(Continued)

OTHER PUBLICATIONS

PCT International Search Report and Written Opinion of International Searching Authority dated Sep. 1, 2018 corresponding to PCT International Application No. PCT/EP2017/076400 filed Oct. 17, 2017.

(Continued)

*Primary Examiner* — Thomas C Lee
*Assistant Examiner* — Ameir Myers
(74) *Attorney, Agent, or Firm* — Henry M. Feiereisen LLC

(57) ABSTRACT

A movement controller of a machine uses in the context of processing a part program defining a useful processing action a parameter set having a plurality of parameters to determine, based on commands of the part program and actual values of a number of axes of the machine controlled by the movement controller, control commands for drives of the machine which are associated with the axes and to apply (Continued)

the determined control commands to the drives. A checking device checks the respective parameters for compliance with conditions defined by respective physical characteristics. In many cases, the checking device can determine the respective physical characteristics using other parameters of the parameter set.

12 Claims, 5 Drawing Sheets

(58) Field of Classification Search
CPC ........ G05B 19/404; G05B 2219/49181; G05B 13/024; G05B 2219/25298; G05B 11/42; F05B 2260/80; G06F 8/443
See application file for complete search history.

(56) References Cited

U.S. PATENT DOCUMENTS

| | | | |
|---|---|---|---|
| 2007/0038328 | A1 | 2/2007 | Endou et al. |
| 2010/0063608 | A1* | 3/2010 | Miller .................. G05B 19/409 700/97 |
| 2014/0005823 | A1* | 1/2014 | Otsuki ............... G05B 19/4103 700/189 |
| 2016/0209828 | A1* | 7/2016 | Saraie .................. G05B 19/402 |
| 2016/0259327 | A1* | 9/2016 | Oonishi ............. G05B 19/4141 |
| 2017/0300036 | A1* | 10/2017 | Maeda ............... G05B 19/0426 |
| 2019/0179291 | A1* | 6/2019 | Olsson ............... G05B 19/4155 |
| 2019/0193167 | A1* | 6/2019 | Horiuchi ............... B25J 13/085 |

FOREIGN PATENT DOCUMENTS

| | | |
|---|---|---|
| CN | 1916799 A | 2/2007 |
| CN | 104914716 A | 9/2015 |
| DE | 19740974 A1 | 3/1999 |
| DE | 102006025903 A1 | 12/2007 |
| WO | WO 2005022279 A1 | 3/2005 |
| WO | WO 2006131664 A1 | 12/2006 |

OTHER PUBLICATIONS

PCT International Preliminary Examination Report and Written Opinion of International Examination Authority dated Nov. 20, 2018 corresponding to PCT International Application No. PCT/EP2017/076400 filed Oct. 17, 2017.

Lulu, Wu et al: "Parameter Identification of Servo Control System Based on Unbiased Least Square Method"; China Mechanical Engineering; vol. 27, No. 1, pp. 109-113, Jan. 31, 2016.

Dong, Li-Hong: "Parameter Identification of the DC Servo Systems and Friction Compensation Control Based on Genetic Algorithms"; Computer Engineering & Science; vol. 33, No. 12, pp. 174-178, Dec. 31, 2011.

Shang, Hua et al: "Parameter estimation and outliers detection based on Bayesian method" Journal of Chingqing University of Posts and Telecommunications (Natural Science Edition) vol. 28, No. 1, Year: Feb. 2016, pp. 138-1421 ISSN: 1673-825X.

* cited by examiner

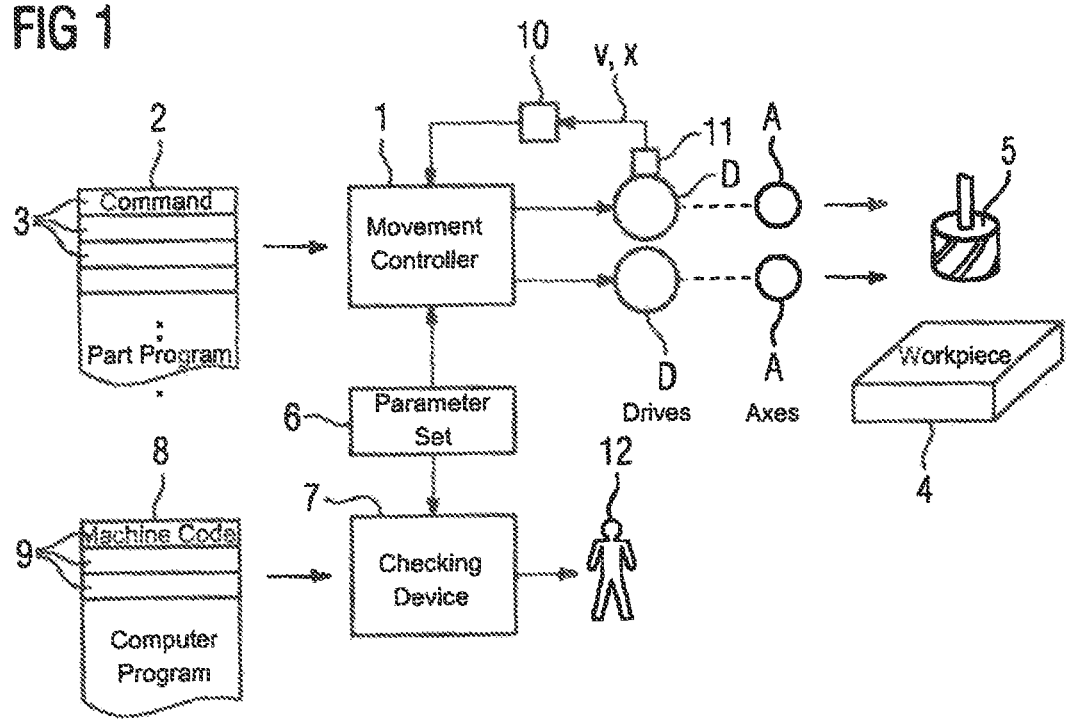
FIG 1
FIG 2
$$v_{max} \approx k \cdot n_{max}$$
$$a_{max} \approx \frac{k}{m} \cdot M_{max}$$
$$a_{max} \approx \frac{k}{m} \cdot k' \cdot I_{max}$$

AUTOMATIC OPTIMIZATION OF THE PARAMETERIZATION OF A MOVEMENT CONTROLLER

CROSS-REFERENCES TO RELATED APPLICATIONS

This application is the U S. National Stage of International Application No. PCT/EP2017/076400, filed Oct. 17, 2017, which designated the United States and has been published as International Publication No. WO 2018/073200 and which claims the priority of European Patent Application, Serial No. 16194333.7, filed Oct. 18, 2016, pursuant to 35 U.S.C. 119(a)-(d).

BACKGROUND OF THE INVENTION

The present invention is based on a checking method for a parameter set of a movement controller comprising a plurality of parameters,
wherein the parameters of the movement controller are used within the scope of executing a part program defining a useful processing action in order to determine control commands, on the basis of commands of the part program and actual values of a number of axes of a machine controlled by the movement controller, for drives of the machine which are associated with the axes and to apply the determined control commands to the drives.

The quality of the behavior of the axes of a tool or production machine or of a robot is evaluated in particular in accordance with the criteria as to with which precision and with which temporal behavior positions can be approached, with which speed and accuracy malfunctions can be well controlled and which degree of faults is assumed when a multiaxial contour is started. All these criteria are influenced to a significant degree by the parameterization of a plurality of drive and control parameters of the movement controller. An optimal setting of all parameters requires a detailed analysis and a profound knowledge of the interaction of the electrical system (drives and their activation) on the one hand and the mechanical system (conversion into mechanical movement) on the other hand. The optimal setting of the parameters can therefore only be achieved by experts.

Although the optimal setting can only be achieved by experts, it is still possible to check a part of the parameterization using simple rules at least with respect to plausibility and compliance with limits. The aim of a testing of this type is in particular to avoid a very inaccurate parameterization of the movement controller, which may compromise the safety of the machine. A further aim is to check the parameter for consistency and technically or technologically useful values.

The drive and control parameters are generally only present as lists. An intellectual or automated check is not carried out, but is only performed intellectually on a case-by-case basis should problems occur. The check requires expert knowledge with regards to the significance of the drive and control parameters, the interaction of the various parameters and useful values and value ranges for the individual parameters.

The publication WO 2005/022279 A1 discloses a method for parameterizing an automation device, in which a process is run or operated, wherein the automation device is parameterized with the aid of automatically generated device-specific and/or process-specific parameters.

The publication DE 102006025903 A1 discloses a method for process regulation when electronic or microme-chanical components are produced and a manufacturing plant for producing such components. Here products produced are measured at random and system parameters are automatically calculated after each measurement and conventional drifts and offsets of system components are thus corrected independently.

The publication DE 19740974 A1 discloses a book manufacturing system, which comprises a book manufacturing line with a number of manufacturing machines, sensors for monitoring machine parameters, actuators for setting machine parameters, display devices for user prompting, input devices for controlling and confirming as well as computers, by means of which dates of orders are processed in a program-controlled manner, device measures are performed and machine processes are monitored.

The object of the present invention consists in creating possibilities by means of which a comprehensive check of a parameter set of a movement controller is automatically possible in a simple and reliable manner.

SUMMARY OF THE INVENTION

According to one aspect of the invention, the object is achieved by a checking method for a parameter set of a movement controller, the method including a plurality of parameters, wherein the parameters of the movement controller are used within the scope of processing a part program defining a useful processing action in order to determine control commands, using commands of the part program and actual values of a number of axes of a machine controlled by the movement controller for drives of the machine which are associated with the axes and to apply the determined control commends to the drives, wherein a checking device checks the parameters in each case for the compliance with conditions defined by respective physical characteristics.

Advantageous embodiments of the checking method form the subject matter of the dependent claims.

In accordance with the invention, a checking method is created for such a parameter set of a movement controller of this type, in which a checking device checks the parameters in each case for the compliance of conditions defined by respective physical characteristics.

In many cases, the physical characteristics are not unconditional. In such cases it is possible, for instance, for the checking device to determine the respective physical characteristics in each case on the basis of other parameters of the parameter set.

The parameter to be checked can be an electrical or electromechanical property of one of the drives, for instance. In this case, the physical characteristic can be a mechanical property of the axis driven by the respective drive.

Alternatively, the parameter to be checked can be a smoothing time of an actual value filter, for instance. In this case, the physical characteristic can be a transducer resolution of a transducer, the actual value of which is fed to the actual value filter.

Alternatively, the parameter to be checked can be a control parameter of a controller acting on one of the drives, for instance. In this case, the physical characteristic may be a combination of at least one clock cycle, with which the controller is operated, and a mass of the axis driven by the respective drive (or a for this purpose equivalent variable such as a moment of inertia, for instance).

Alternatively, the parameter to be checked can be the maximum value of an amplification of a frequency response of a control loop closed by the movement controller by means of controlling the machine, for instance. In this case, the physical characteristic may be a limit amplification factor.

Alternatively, the parameter to be checked can be the activation state of an actual value filter, for instance. In this case, the physical characteristic can be a transducer resolution of a transducer, the actual value of which is fed to the actual value filter.

In many cases, the parameter to be checked can be a DSC (=dynamic stiffness control or dynamic servo control) or an inversion of an associated actual position value. In this case, the physical characteristic can in each case be conversely the corresponding inversion of an actual position value or the associated DSC.

Alternatively, the parameter to be checked can be for instance a static and/or dynamic behavior of an axis of the machine. In this case, the physical characteristic can be the static and/or dynamic behavior of another axis of the machine.

Alternatively, the parameter to be checked can be for instance at least one clock cycle, with which the movement controller determines the control commands. In this case, the physical characteristic can be the combination of a processor capacitor and the number of axes.

Alternatively, the parameter to be checked can be a parameter vector which can be selected by the movement controller as a unit, for a first mode of operation of the movement controller. In this case, the physical characteristic can be a parameter vector, which can be selected as a unit, for a second mode of operation of the movement controller.

Alternatively, the parameter to be checked can be, for instance, a first compensation value occurring at a first location along a movement path of an axis. In this case, the physical characteristic can be a second compensation value occurring at a second location along the movement path of the axis.

The object is further achieved by a computer program comprising machine code which is executable by a checking device, wherein the execution of the machine code by the checking device causes the checking device to carry out a checking method of this type.

The object is further achieved by a checking device, wherein the checking device is programmed with a computer program of this type, so that during operation the checking device carries out a checking method of this type.

BRIEF DESCRIPTION OF THE DRAWING

The afore-described properties, features and advantages of this invention as well as the manner in which they are achieved will become clearer and more comprehensible in conjunction with the following description of the exemplary embodiments, which are explained in more detail in conjunction with the drawings, which show, in a schematic representation:

FIG. 1 a part program, a movement controller and a checking device,

FIGS. 2 to 4 in each case parameters and checks,

DETAILED DESCRIPTION OF PREFERRED EMBODIMENTS

Figure 3:
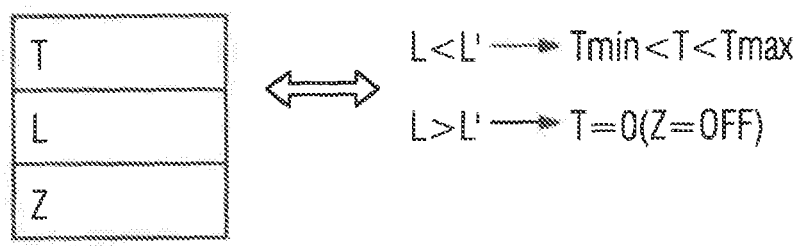

A movement controller 1 executes a part program 2 according to FIG. 1. In particular, the part program 2 comprises a plurality of commands 3. The execution of the part program 2 causes a useful processing action of a workpiece 4 by a tool 5. The useful processing action is therefore defined by the part program 2, Within the scope of the execution of the part program 2, the movement controller 1 accesses a parameter set 6. The parameter set 6 is stored in the movement controller 1. It comprises a plurality of parameters. Some of the parameters are then explained again in more detail. The parameters are used by the movement controller 1 to determine control commands, using commands 3 of the part program 2 and actual values x (for the position) and v (for the speed) of a number n of axes A of a machine controlled by the movement controller 1, for drives D which are associated with the axes A and to apply the determined control commands to the drives D. The number n of axes A is generally three or more, for instance four, five or six axes A.

A checking device 7 is present for checking the part program 1, The checking device 7 can be an integral part of the movement controller 1 or a device which differs from the movement controller 1. The checking device 7 is programmed with a computer program 8, The computer program 6 comprises machine code 9, which can be executed by the checking device 7. The execution of the machine code 9 by the checking device 7 causes the checking device 7 to carry out a checking method during operation. Within the scope of performing the checking method, the checking device 7 checks the parameters of the parameter set 6 in each case for compliance with the conditions defined by the respective physical characteristics. This is apparent from the explanations below relating to the further PG. It is possible for the respective physical characteristics to be defined absolutely or for the checking device 7 to be predetermined explicitly. In many cases it is possible, however, for the checking device 7 to determine the respective physical characteristics in each case using other parameters of the parameter set 6. This is also apparent from the explanations below relating to the further FIG.

It is therefore possible, for instance, according to the representation in FIG. 2, for the parameter to be checked to be an electrical or electromechanical property of one of the drives D. In this case, the physical characteristic is a mechanical property of the axis A driven by the respective drive D. For instance, the electromechanical property "maximum rotational speed" nmax can be predetermined. In this case, the checking device 7 can check, on the basis of the mechanical property "maximum speed" vmax, generally likewise predetermined as parameter, in conjunction with a translation k whether the property "maximum rotational speed" nmax corresponds exactly or at least substantially (for instance at ±10% precisely or ±20% precisely) with the mechanical property "maximum speed" vmax by taking into account the translation k. Alternatively or in addition, the electromechanical property "maximum torque" Mmax can be predetermined. In this case, the checking device 7 can check, on the basis of the mechanical properties "maximum acceleration" amax and "mass" m, generally likewise predetermined as parameters, in conjunction with the translation k whether the property "maximum rotational speed" Mmax k corresponds exactly or at least substantially (for instance at ±10% precisely) with the mechanical property "maximum acceleration" amax by taking into account the translation k. Instead of the electromechanical property "maximum torque" Mmax, the electrical property "maximum current" Imax can alternatively also be used in conjunction with a conversion constant k'.

FIG. 2 therefore also shows at the same time examples in which the checking device 7 determines the physical characteristics on the basis of other parameters of the parameter set 6. Furthermore, the procedure in FIG. 2 can be realized individually for each drive D and the associated axis A.

Alternatively or in addition, it is possible, according to FIG. 3, for the parameter to be checked to be a smoothing time T of an actual value filter 10 (see FIG. 1). In this case, the physical characteristic can be a transducer resolution L of a transducer 11, the actual value of which is fed to the actual value filter 10. In particular, the checking device 7 can check whether the smoothing time T lies between a minimum value Tmin and a maximum value Tmax, wherein the minimum value Train and the maximum value Tmax can be determined by the checking device 7 as a function of the transducer resolution L.

It is also possible for the checking device 7 to only then carry out the check if the transducer resolution L has a relatively small value (below a limit resolution L'). If this check is carried out, in the instance that the transducer resolution L lies above the limit resolution L', it can alternatively be checked whether the actual value filter 10 is actually activated. Because with an adequately high transducer resolution L, a filtering is often not only not required but may even be disadvantageous. In this case, the parameter to be checked is the activation state Z of the actual value filter 10 (ON or OFF). The physical characteristic is in this case the transducer resolution L of the transducer 11. The actual value filter 10 and the transducer 11 are only shown in FIG. 1 for the drive D of a single axis A. They are however generally present for each drive D.

Both the smoothing time T and also the transducer solution L and also the activation state Z can be defined as parameters. The embodiment according to FIG. 3 therefore also shows examples, with which the checking device 7 determines the physical characteristics on the basis of other parameters of the parameter set 6. Furthermore, the procedure in FIG. 3 can be realized individually for each transducer 10.

Figure 4:
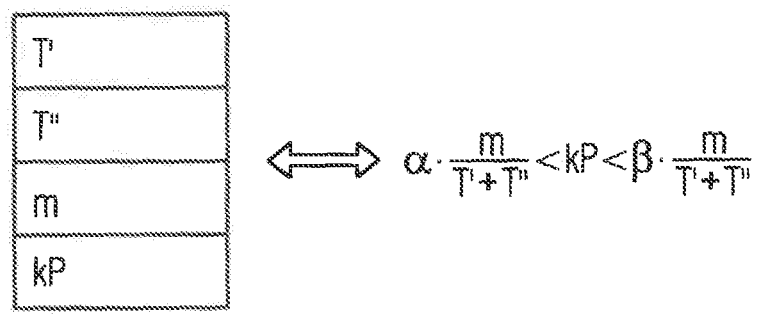

Furthermore, it is possible according to the representation in FIG. 4 for the parameter to be checked to be a control parameter kP of a controller acting on one of the drives D. In this case, the physical characteristic can be a combination of at least one dock cycle T, T", with which the controller is operated, and the mass m of the axis A driven by the respective drive D. If, for instance, T is the interpolation cycle of the speed controller and T" is the interpolation cycle of the current controller of one of the drives D, for the amplification factor kP of the proportional controller the relationship should apply that it lies between α-times and β-times the mass m, divided by the total of the cycle times T', T". α and β are suitably selected constants. For instance, a can apply to the constant such that it lies in a range between 0.10 and 0.15, in particular with approximately 0.125. The constant 13 should have approximately twice the value of the constant α. It should therefore lie in the range between 0.20 and 0.30.

The embodiment according to FIG. 4 therefore also shows an example, with which the checking device 7 determines the physical characteristics on the basis of other parameters of the parameter set 6. Furthermore, the procedure in FIG. 3 can be realized individually for each drive D.

Figure 5:
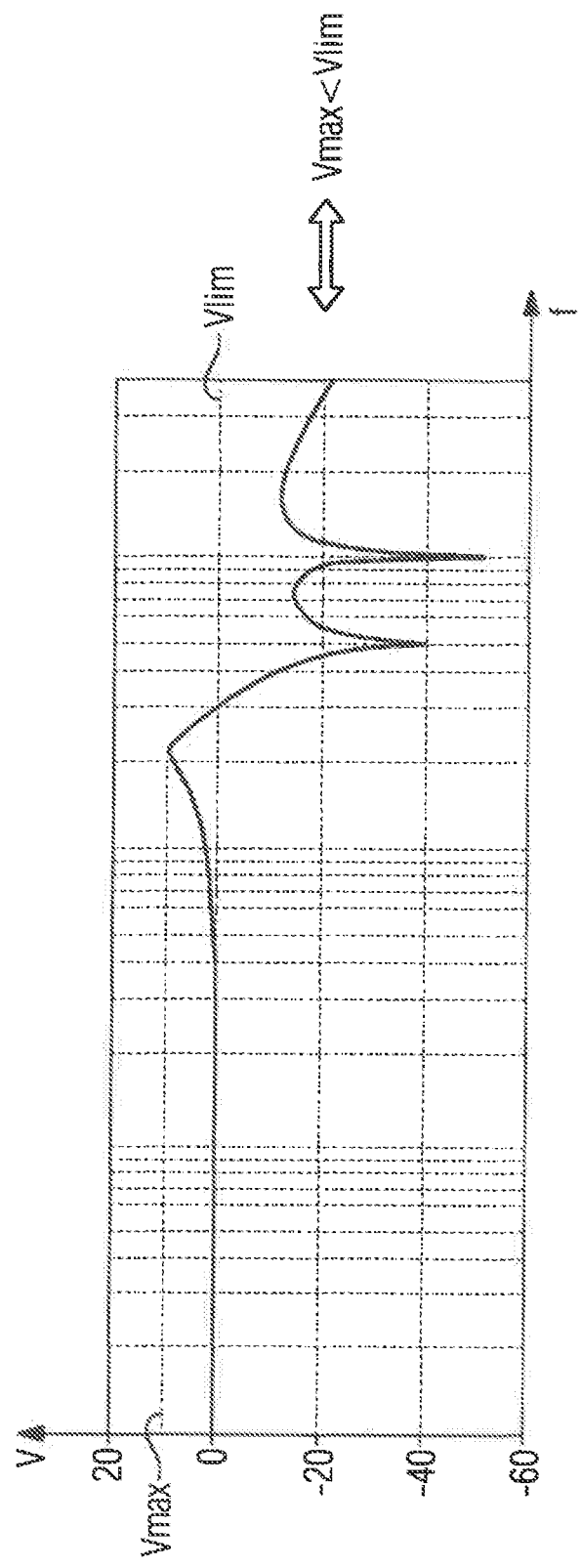
FIG. 5 a frequency response.

Furthermore, it is possible according to the representation in FIG. 5 for the parameter set 6 to comprise a description of a frequency response. The frequency response comprises an amplification V of an error variable as a function of the frequency f and the associated phase response. In FIG. 5 the amplification V is shown logarithmically upward (namely in decibels). The frequency f is likewise shown logarithmically in FIG. 5. With a frequency response as a parameter, the checking device 7 can check whether a maximum value Vmax of the amplification V is at maximum size like a limit amplification factor Vlim. The limit amplification factor Vlim for its part may have at most a value of 1. In the case of the embodiment according to FIG. 5, the parameter to be checked is therefore the maximum value Vmax, the physical characteristic of the omit amplification factor Vlim. The limit amplification factor Vlim can be predetermined as a parameter. Alternatively, the limit amplification factor Vlim can be fixed to the value 1 by the checking device 7.

Figure 6:
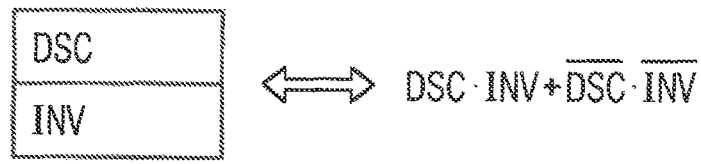
FIGS. 6 to 9 in each case parameters and checks.

Furthermore, it is possible according to the representation in FIG. 6 for the parameter set 6 to comprise a parameter DSC. In this case, the parameter set 6 can also comprise an actual value inversion INV as a parameter. The actual value inversion INV causes an inversion of the associated actual position value. In some cases, the parameters DSC and INV must either both be set or both not set. In such cases one of the two parameters can therefore optionally be considered to be the parameter to be checked and the respective other parameter the physical characteristic. This is shown in FIG. 6 in a Boolean notation.

In conjunction with FIGS. 7 and 8, the digits 1 and 2 etc. are subsequently added to the respective reference signs in order to be able distinguish individual axes A1, A2 and their associated parameters from one another.

It is possible for the parameter to be checked to be a static behavior of an axis A1 of the machine and for the physical characteristic to be the static behavior of another axis A2 of the machine. For instance, positioning accuracies δ1, δ2 can be defined as parameters of the parameter set 6. The positioning accuracy δ1 specifies in accordance with the representation in FIG. 7, the accuracy with which a in principle arbitrary position P can be approached in a first direction R1 by means of the first axis A1. The positioning accuracy δ2 similarly specifies the accuracy with which the position P can be approached in a second direction R2 by means of the second axis A1. The check carried out by the checking device 7 can consist according to the representation in FIG. 7 in checking whether the quotient of the positioning accuracies δ1, δ2 has approximately the value 1, for instance with an accuracy of ±10% or ±20%.

Alternatively or in addition it is possible for the parameter to be checked to be a dynamic behavior of the axis A1 and the physical characteristic to be the dynamic behavior of the other axis A2. For instance, according to the representation in FIG. 8, the maximum speeds vmax1, vmax2 and/or the maximum accelerations amax1 amax2 can to that effect be checked to determine whether the quotient of the maximum speeds vmax1, vmax2 or the maximum accelerations amax1 amax2 have approximately the value 1, for instance with an accuracy of ±10% or ±20%. Furthermore, it can be checked whether step responses of the axes A1, A2 harmonize with one another, particularly substantially the same time constants. The time constants can be determined as such. Alternatively, they can be determined using clock cycles T1' and T2' or T1" and T2" in conjunction with the associated amplification factors kP1, kP2.

Figure 7:
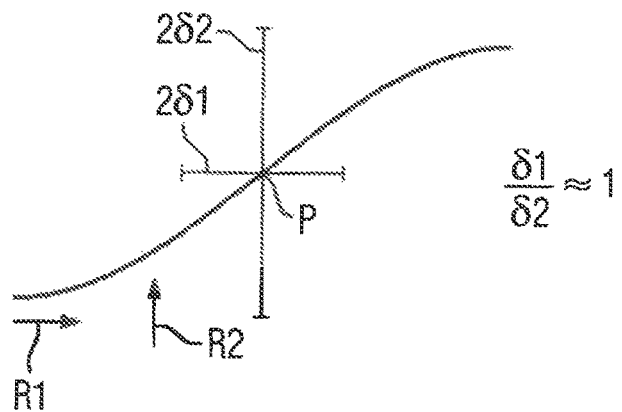
Figure 8:
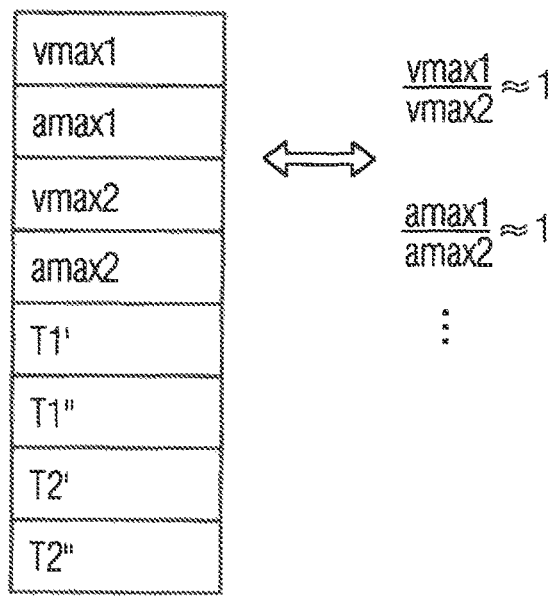

The embodiments according to FIGS. 7 and 8 therefore also shows examples, with which the checking device 7 determines the physical characteristics on the basis of other parameters of the parameter set 6. Furthermore, the procedure in FIGS. 7 and 8 can be realized individually for each pair of axes A.

Figure 9:
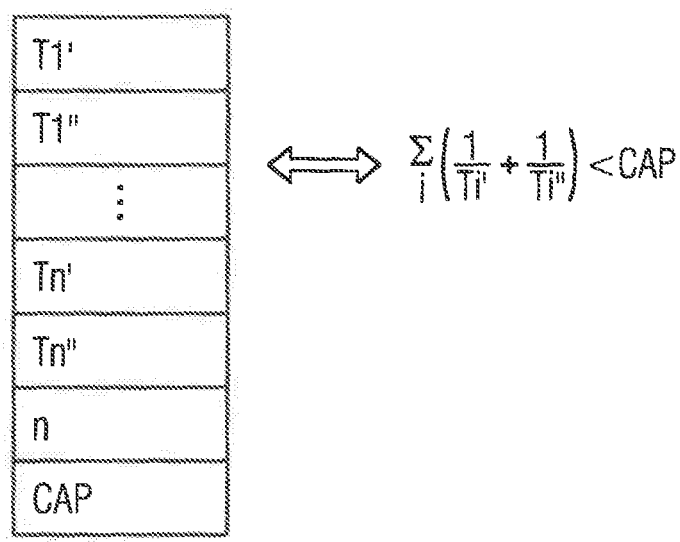

Alternatively or in addition, it is possible according to the representation in FIG. 9 for the parameter to be checked to be at least one clock cycle T1', ..., Tn', T1", ..., Tn", with which the movement controller 1 determines the control commands for the axes A, In this case, the physical characteristic may be the combination of a processor capacity CAP (in other words a specification relating to the performance of the processor of the movement controller 1) and the number n of axes A. In particular, the checking device 7 can check whether the processor of the movement controller 1 is overstressed.

Figure 10:
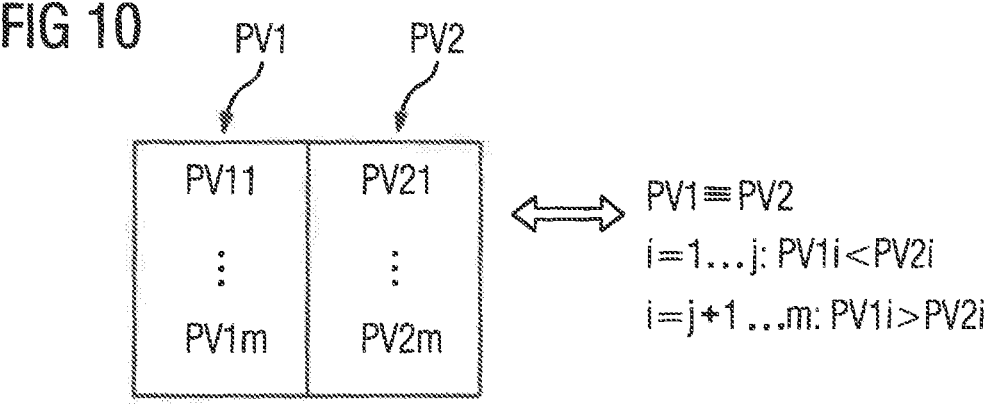
FIG. 10 parameter groups and checks.

It is even possible to compare entire parameter groups of the parameter set 6 with one another. By way of example, respective parameter vectors PV1, PV2 can be defined for different modes of operation (for instance roughing and finishing). The parameter vectors PV1, PV2 can be selected by the movement controller 1 in each case as a unit within the scope of executing the part program 2. The parameter vectors PV1, PV2 can be what are known as G-groups, for instance. According to the representation in AG 10, each parameter vector PV1, PV2 comprises in each case a plurality of individual parameters PV11, PV1$m$ or PV21, PV2$m$. In this case, the checking device 7 can check, in accordance with the representation in FIG. 10, firstly whether the two parameter vectors PV1, PV2 actually differ from one another or whether they are identical. According to the representation in FIG. 10, the checking device 7 can on the other hand check whether specific parameters PV11, PV1$m$ of the one parameter vector PV1 are greater than or less than the parameters PV21, PV2$m$ of the other parameter vector PV2.

Figure 11:
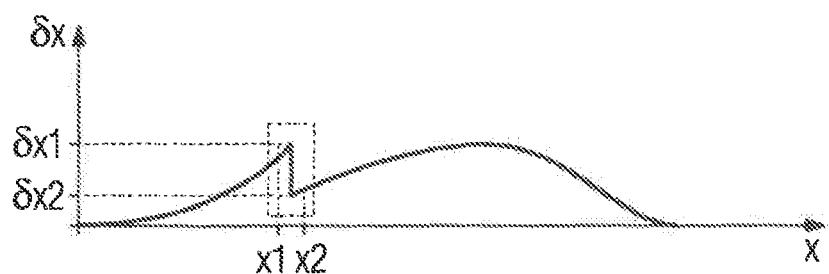
FIG. 11 compensation values and checks.

According to the representation in FIG. 11, how large a systematic positioning error 6$x$ of the respective axis A is as a function of the movement path x of the respective axis A is also stored for each axis A in the movement controller 1 as an integral part of the parameter set 6. The knowledge of the systematic positioning error 6$x$ allows for a corresponding compensation by a corresponding compensation value. It is possible for the parameter to be checked to be a first compensation value δx1 occurring at a first site x1 along the movement path of the axis A. The physical characteristic can in this case be a second compensation value δx2 occurring at a second point x2 along the movement path x. In particular, it is possible for the course of the compensation values to be checked for monotony, jumps or the sites of minimum and maximum.

The procedure explained above in conjunction with FIGS. 2 to 11 can be realized individually or in any combination depending on requirements.

The results of the checks performed by the checking device 7 can be output for instance as a list to a user 12 (see FIG. 1). Problem sites can be highlighted visually in the output. With an output via a display unit, a dynamic variation is possible, for instance a flashing. Both with an output via a display unit and also with an output via a printer or suchlike, a highlighting by means of a frame, by means of bold print or by means of coloring (for instance red for critical values, yellow for warnings and green or not highlighted for standard values) is possible. In some instances, the checking device 7 can propose even improved values for the parameters of the parameter set 6 to the user 12.

In summary, the present invention thus relates to the following subject:

Within the scope of executing a part program 2 defining a useful processing action, a movement controller 1 uses parameters of a parameter set 6 comprising a plurality of parameters to determine control commands, using commands 3 of the part program 2 and actual values x, v of a number (n) of axes A of a machine controlled by the movement controller 1, for drives D of the machine which are associated with the axes A and to apply the determined control commands to the drives D. A checking device 7 checks the parameters in each case for the compliance with conditions defined by respective physical characteristics. In many cases it is possible, however, for the checking device 7 to determine the respective physical characteristics in each case on the basis of other parameters of the parameter set 6.

The present invention has many advantages. In particular, a comprehensive testing and optimization of the parameter set 6 is possible in an easy and reliable manner. In many cases, the checking device 7 can even determine the checking conditions using the parameter set 6 itself.

Although the invention has been illustrated and described in detail with the preferred exemplary embodiment, the invention is not restricted by the examples disclosed and other variations can be derived therefrom by a person skilled in the art without departing from the protective scope of the invention.

The invention claimed is:

1. A method for checking a parameter set composed of a plurality of parameters of a movement controller, the method comprising:
determining, from a first set of the plurality of parameters, control commands for drives of a machine which are associated with axes of the machine, with the control commands based on commands of a part program that defines a processing action and on actual values of a position and a speed of a number of the axes of the machine;
applying the determined control commands to the drives; and
checking with a checking device the parameters from the first set for compliance with conditions defined by a physical characteristic of the machine,
wherein a parameter from the first set is a positioning accuracy or a dynamic behavior of an axis of the machine, and wherein the physical characteristic is the dynamic behavior of another axis of the machine determined from second set of the plurality of parameters of the parameter set which is different from the first set.

2. The method of claim 1, wherein a parameter to be checked is an electrical or electromechanical parameter of one of the drives, and wherein the physical characteristic is a mechanical parameter of an axis driven by the one drive.

3. The method of claim 1, wherein a parameter to be checked is a smoothing time of an actual value filter, and wherein the physical characteristic is a transducer resolution of a transducer, with an actual value of the transducer being supplied to the actual value filter.

4. The method of claim 1, wherein a parameter to be checked is a control parameter of a controller operating on one of the drives, and wherein the physical characteristic is a combination of at least one clock cycle, with which the controller is operated, and a mass of an axis driven by the drive associated with the axis.

5. The method of claim 3, wherein a parameter to be checked is a maximum value of an amplification of a frequency response of a closed-loop control loop defined by the movement controller, and wherein the physical characteristic is a limit amplification factor.

6. The method of claim 1, wherein a parameter to be checked is an activation state of an actual value filter, and wherein the physical characteristic is a transducer resolution of a transducer, with an actual value of the transducer being supplied to the actual value filter.

7. The method of claim 1, wherein a parameter to be checked is a Dynamic Servo Control (DSC) or an inversion of an associated actual position value, and wherein the physical characteristic is the inversion of an associated actual position value or the Dynamic Servo Control (DSC).

8. The method of claim 1, wherein a parameter to be checked is at least one dock cycle, with which the movement controller determines the control commands, and wherein the physical characteristic is the combination of a processor capacity and the number of axes.

9. The method of claim 1, wherein a parameter to be checked is a parameter vector selected by the movement controller as a unit for a first operating mode of the movement controller, and wherein the physical characteristic is a parameter vector selected by the movement controller as a unit for a second operating mode of the movement controller.

10. The method of claim 1, wherein a parameter to be checked is a first compensation value occurring at a first location along a movement path of an axis, and wherein the physical characteristic is a second compensation value occurring at a second location along the movement path of the axis.

11. A computer program product comprising machine code embodied on a non-transitory medium, wherein the machine code, when loaded into a memory of a checking device of a machine and executed by the checking device, causes the checking device to check parameters from a parameter set composed of a plurality of parameters of a movement controller of the machine for compliance with conditions defined by a physical characteristic of the machine, wherein a parameter from the plurality of parameters of the movement controller is a positioning accuracy or a dynamic behavior of an axis of the machine, and wherein the physical characteristic of the machine is the dynamic behavior of another axis of the machine,
wherein control commands for drives of the machine, which are associated with axes of the machine, are determined from the plurality of parameters, and the determined control commands are applied to the drives, with the control commands being based on commands of a part program that defines a processing action and on actual values of a position and a speed of a number of the axes of the machine.

12. A checking device, comprising:
a processor; and
a memory,
wherein the checking device is programmed with a computer program comprising machine code embodied on a non-transitory medium, wherein the machine code, when loaded into the memory of the checking device of a machine and executed by the checking device, causes the checking device to check parameters from a parameter set composed of a plurality of parameters of a movement controller of the machine for compliance with conditions defined by a physical characteristic of the machine, wherein a parameter from the plurality of parameters of the movement controller is a positioning accuracy or a dynamic behavior of an axis of the machine, and wherein the physical characteristic of the machine is the dynamic behavior of another axis of the machine, wherein control commands for drives of the machine, which are associated with axes of the machine, are determined from the plurality of parameters, and the determined control commands are applied to the drives, with the control commands being based on commands of a part program that defines a processing action and on actual values of a position and a speed of a number of the axes of the machine.

* * * * *